United States Patent [19]

Mani et al.

[11] 3,968,319

[45] July 6, 1976

[54] PLASTIC PIGMENTS FOR PAPER COATINGS

[75] Inventors: Inder Mani; Alexander Shand, both of Midland, Mich.

[73] Assignee: The Dow Chemical Company, Midland, Mich.

[22] Filed: June 10, 1974

[21] Appl. No.: 478,125

[52] U.S. Cl. ........................ 428/511; 260/17.4 ST; 260/42.21; 428/514; 428/537; 526/304; 526/346; 526/34
[51] Int. Cl.² ...................... D21H 1/28; C08F 33/08
[58] Field of Search ............... 260/17.4 ST, 80.3 N; 428/511, 514, 537

[56] References Cited
UNITED STATES PATENTS

| | | | |
|---|---|---|---|
| 3,428,582 | 2/1969 | Deex | 260/17.4 X |
| 3,699,112 | 10/1972 | Konishi et al. | 260/17.4 X |
| 3,779,800 | 12/1973 | Heiser | 428/511 X |

*Primary Examiner*—Michael R. Lusignan
*Attorney, Agent, or Firm*—M. S. Jenkins

[57] ABSTRACT

Paper coatings exhibiting improved pick resistance at lower binder levels are provided by incorporating into a conventional binder a pigment comprising a copolymer of an ethylenically unsaturated hard monomer such as styrene and an ethylenically unsaturated amide such as acrylamide in the form of non-film forming discrete particles having an average particle diameter in the range from about 0.25 to about 1 micrometer.

13 Claims, No Drawings

PLASTIC PIGMENTS FOR PAPER COATINGS

BACKGROUND OF THE INVENTION

This invention relates to plastic pigments for paper coatings having excellent opacity, visual gloss and improved pick resistance.

Most paper surfaces require a coating in order to have good printing qualities and adequate opacity. Conventional paper coatings contain inorganic pigments such as kaolin clay or titanium dioxide to impart the required opacity to the coated paper substrate. However, the inorganic pigments substantially increase the coating weight thereby increasing mailing costs. Inorganic pigments also tend to lower coating gloss and pick resistance.

Recently, paper coatings containing discrete plastic particles as pigment have been disclosed in U.S. Pat. No. 3,779,800 to E. Heiser and U.S. Pat. No. 3,595,823 to D. Huang. While coating weight is lower and gloss is generally improved in such coatings, the pick resistance of such coatings is not appreciably improved over that of the inorganic pigment coatings. Further, paper coatings containing the plastic pigment exhibit increased tendency to stick to calender rolls during the finishing process.

Accordingly, it would therefore be highly desirable to provide a paper coating having improved pick resistance and resistance to sticking during calendering while retaining other characteristics similar to those of the aforementioned U.S. Pat. No.

SUMMARY OF THE INVENTION

In one aspect, the present invention is a novel plastic pigment comprising a water-insoluble, copolymer of an ethylenically unsaturated hard monomer and at least about 1 weight percent of ethylenically unsaturated amide in the form of non-film forming discrete particles having an average diameter in the range from about 0.25 to about 1 micrometer with no more than about 10 weight percent of said particles having diameters outside said range. Hereinafter the foregoing pigment will be referred to as an amide pigment.

In a second aspect, the present invention is a novel paper coating comprising a binding amount of a binder and an opacifying amount of a pigment containing an amount of the amide pigment sufficient to provide improved pick resistance as compared to a coating containing only inorganic pigment.

In a third aspect, the present invention is a paper substrate coated with said novel paper coating composition.

Paper coatings containing the aforementioned amide pigment exhibit surprisingly greater pick resistance and substantially decreased tendency to stick to the calender rolls during finishing than do conventional plastic pigments as well as equivalent or better gloss and opacity. Thus, the coated papers of this invention are very useful as printing papers. Such coated papers are particularly useful as printing papers for web offset, sheet offset or letterpress printing which require a high pick resistance during the printing operation wherein the printing is applied to a surface of the coated paper.

DETAILED DESCRIPTION OF EMBODIMENTS

The discrete particles of the amide pigment are composed of non-film forming copolymer of a hard monomer and $\alpha,\beta$-ethylenically unsaturated amide. The copolymer is water-insoluble and is insoluble in the particular binder to be used in the paper coating composition.

By "non-film forming" it is meant that the amide pigment does not coalesce to form a film at ambient temperature and at temperatures that the amide pigment attains during drying and finishing, e.g., supercalendering, of the coated paper. While such temperature requirement varies with the type of finishing method used, it is preferred that the polymer of the amide pigment not be film forming at temperatures of 140°F. or less, particularly if the coated surface is to be finished by processes such as calendering or supercalendering. If the discrete particles of the amide pigment are permitted to fuse or coalesce throughout the coating during the coating and finishing process, the light scattering properties (opacity) of the coated surface will be reduced substantially. Accordingly, preferred copolymers of the amide pigment have Vicat Softening Points, as determined by ASTM D-1525-65T, greater than about 140°F. For the same reasons, it is also necessary that the copolymer of the amide pigment be insoluble in water and in the binder of the coating.

The copolymer of the amide pigment comprises from about 50 to about 99, preferably from about 77 to about 98, weight percent of an emulsion polymerizable, $\alpha,\beta$-ethylenically unsaturated hard monomer; from about 1 to about 20, preferably from about 2 to about 10, weight percent of emulsion polymerizable, $\alpha,\beta$-ethylenically unsaturated amide; and up to 40, preferably from 0 to about 20 weight percent of an emulsion polymerizable, $\alpha,\beta$-ethylenically unsaturated soft monomer.

Preferred emulsion polymerizable hard monomers which can be polymerized and/or copolymerized with each other in any proportions and/or with other monomers as specified hereinafter to yield such polymers include $\alpha,\beta$-ethylenically unsaturated monomers such as the monovinylidene carbocyclic monomers, e.g., styrene, $\alpha$-methylstyrene, ar-(t-butyl)styrene, ar-methylstyrene, ar,ar-dimethylstyrene, ar-chlorostyrene, ar-(t-amyl)styrene, ar-bromostyrene, ar-fluorostyrene, ar-cyanostyrene, ar-methoxystyrene, ar-ethylstyrene, ar-hydroxymethylstyrene, ethoxystyrene, ar-chloro-ar-methylstyrene, ar,ar-dichlorostyrene, ar,ar-difluorostyrene, vinyl naphthalene, and other such emulsion polymerizable monomers having not more than 26 carbon atoms; esters of $\alpha,\beta$-ethylenically unsaturated carboxylic acids which polymerize to form non-film forming polymers, e.g., methyl methacrylate, chloroethyl methacrylate, 2-butyl methyacrylate, 3,3-dimethylbutyl methacrylate, 3,3-dimethyl-2-butyl methacrylate, ethyl methacrylate, isobutyl methacrylate, isopropyl methacrylate, phenyl methacrylate, butyl chloroacrylate, cyclohexyl chloroacrylate, ethyl chloroacrylate, methyl chloroacrylate, isopropyl chloroacrylate and other such esters capable of being polymerized to form hard polymers; $\alpha,\beta$-ethylenically unsaturated esters of non-polymerizable carboxylic acids, e.g., vinyl benzoate, vinyl ar-toluate, vinyl ar-ethylbenzoate, allyl ar-ethylbenzoate, vinyl trimethylacetate, vinyl pivilate, vinyl trichloroacetate and other such monomers wherein the unsaturated moiety has from 2 to 14 carbon atoms and the acid moiety has from 2 to 12 carbon atoms; $\alpha,\beta$-ethylenically unsaturated nitriles, e.g., acrylonitrile, methacrylonitrile, fumaronitrile and other such nitriles having not more than 12 carbon atoms; other polymerizable vinyl monomers such as vinyl chloride, vinyl bromide and the like. Of the foregoing monomers, the monovinylidene carbocyclic aromatic monomers, particularly styrene, and mixtures of styrene and acrylonitrile are especially preferred.

The foregoing monomers are generally classified as hard monomers because they homopolymerize or copolymerize with each other to form polymers which are non-film forming as required in the practice of this invention.

Exemplary suitable amides are emulsion polyerizable, $\alpha,\beta$-ethylenically unsaturated amides, copolymerizable with the hard monomer preferably such amides which are water-soluble. Suitable amides include acrylamide, methacrylamide, amides of acids such as fumaric acid, maleic acid, itaconic acid, citraconic acid, N-substituted amides such as N'-methylacrylamide, N-isopropylacrylamide, N-(2-hydroxyethyl)acrylamide and N-substituted amides of foregoing acids wherein the substituents are alkyl or hydroxyalkyl. Acrylamide is preferred.

Lesser amounts, such as less than about 40 weight percent based on the polymer, of other ethylenically unsaturated monomers which normally polymerize to form film-forming polymers (so-called soft monomers) are optionally copolymerized with the foregoing hard monomers. Examples of such soft monomers include conjugated aliphatic dienes such as 1,3-butadiene, isoprene, 2-chloro-1,3-butadiene and other such dienes having not more than 14 carbon atoms; alkyl acrylates such as methyl acrylate, ethyl acrylate, propyl acrylate, n-butyl acrylate, isobutyl acrylate, amyl acrylate, lauryl acrylate, isoamyl acrylate, 2-ethylhexyl acrylate, octyl acrylate, and other such acrylates having alkyl moieties of not more than 18 carbon atoms; unsaturated esters of saturated carboxylic acids such as vinyl acetate, vinyl propionate, vinyl butyrate, allyl acetate and other such esters having not more than 18 carbon atoms; esters and half esters of $\alpha,\beta$-ethylenically unsaturated polycarboxylic acids, e.g., dimethyl fumarate, diethyl maleate, methyl ethyl fumarate, ethyl hydrogen maleate, dioctyl fumarate and the like; other copolymerizable vinyl monomers containing a single polymerizable ethylenically unsaturated group such as vinyl fluoride, vinylidene chloride and vinylidene fluoride. Maximum concentrations of these monomers are governed primarily by the temperature to be reached during the employment of the latex and the degree to which a particular monomer lowers the softening point of the resulting copolymer. For illustration, if a highly monodisperse latex of an interpolymer of styrene, butadiene and acrylamide is to be used as the amide pigment, butadiene normally is not present in the copolymer in amount more than about 20 weight percent. If, however, the styrene/butadiene/acrylamide interpolymer has more than the normal amount of cross-linking, butadiene may be present in concentration greater than 20 weight percent with the maximum concentration of butadiene being dependent on the actual degree of cross-linking. Increased cross-linking is usually promoted by irradiation or by use of a suitable cross-linking agent such as unsaturated polyester or polyethylenically unsaturated monomer. Exemplary polyethylenically unsaturated monomers include divinyl benzene, trivinyl benzene, divinyl naphthalene, and the like. In regard to the use of the aforementioned soft monomers, use in any concentration is suitable provided that the resultant polymer is non-film forming as required in the practice of this invention.

It is further understood that in order to be suitable the monomers to be copolymerized with the amide monomer must be inert to the amide functionality such that the amide groups exist as such in the resulting copolymer of the latex.

Preferred polymers of the amide pigment are copolymers of from about 77 to about 98 weight percent of one or more of the aforementioned hard monomers, from about 0 to about 20 weight percent of one or more of the aforementioned soft monomers and from about 2 to about 10 weight percent of one or more of the aforementioned amides, preferably those having 3 to 8 carbon atoms. Especially preferred copolymers are copolymers of from about 77 to about 98 weight percent of monovinylidene carbocyclic aromatic monomers such as styrene and ar-(t-butyl)styrene, from about 0 to about 20 weight percent of $\alpha,\beta$-ethylenically unsaturated nitrile such as acrylonitrile and methacrylonitrile, and from 2 to about 10 weight percent of $\alpha,\beta$-ethylenically unsaturated amide such as acrylamide and methacrylamide. Examples of such especially preferred copolymers are styrene/acrylamide copolymers, styrene/acrylonitrile/acrylamide copolymers, styrene/methacrylamide copolymers and styrene/acrylonitrile/methacrylamide copolymers. In the foregoing preferred copolymers, it is sometimes beneficial to copolymerize from about 1 to about 15 weight percent of polyethylenically unsaturated monomer such as divinyl benzene therewith to provide increased resistance to high temperatures.

In addition to being composed of discrete particles of non-film forming copolymer as set forth hereinbefore, the amide pigment should be in the form of particles having an average diameter in the range from about 0.25 to about 1.0 micrometer, with no more than about 10 weight percent of the particles based on total weight of particles forming the amide pigment having diameters outside said range, preferably not more than 4 weight percent. It is found that an amide pigment which contains an excessive number (>10 weight percent) of particles having diameters less than 0.22 micrometer does not possess the desired binding and opacifying characteristics. Preferably, the average particle diameter of the amide pigment is in the range from about 0.3 to about 0.8 micrometer.

The amide pigment is prepared by an emulsion polymerization method carried out in a manner which insures that the concentration of the surfactant is never greater than the critical micelle concentration (hereinafter referred to as CMC) of the surfactant. Generally, the amount of surfactant employed is sufficient to provide from about 0.1 to about 0.75 CMC, preferably from about 0.125 to about 0.50 CMC.

Also it is desirable that the unsaturated amide be present in a stabilizing amount in the aqueous phase during polymerization. Accordingly the amide is beneficially added at the outset of polymerization or during an early stage thereof. An amount which is sufficient to insure a minimum of at least one weight percent of the amide in the water-insoluble copolymer is generally found to be a stabilizing amount. The stabilizing function of the amide is believed to result from the insitu formation of a water-soluble copolymer of the amide and the hard monomer which acts as an emulsion stabilizer. The water-soluble copolymer is believed to be present in amounts in the range from about 1 to about 30 weight percent based on the weight of the water-insoluble copolymer, preferably from about 2 to about 15 weight percent. The water-soluble copolymer contains sufficient polymerized acrylamide to render the copolymer water-soluble, generally from about 50 to about 99, preferably from about 65 to about 80, weight percent based on the water-soluble copolymer.

For purposes of this invention, critical micelle concentration (CMC), means the concentration of a surfactant in water which is required to form micelles. The relationship of surfactant concentration to CMC is set forth in D. C. Blackley, *High Polymer Latices*, Vol. 1, 270–271 (1966). The amount of surfactant required to provide the desired sub-CMC varies with each surfactant. Accordingly, since CMC for each surfactant can be readily determined by surface tension measurements of aqueous solutions of the surfactant, the amount of surfactant suitably employed is from about 0.1 to about 0.75 CMC, preferably from about 0.125 to about 0.50 CMC wherein values of CMC are in units of grams of surfactant per 100 grams of the aqueous solution. As examples dihexyl sodium sulfosuccinate exhibits a CMC in the range 0.3 to 1.5 grams per 100 grams of aqueous solution depending upon the particular sample chosen, whereas a sample of sodium lauryl sulfate exhibits a CMC value of 0.075 gram per 100 grams of aqueous solution.

In one preferred method, the polymerization zone is purged with inert gas and then charged with water-soluble catalyst, water, surfactant and monomer. The resulting reaction mixture is brought to a suitable reaction temperature usually from about 30° to about 98°C and the reaction is allowed to go to completion. In the practice of this preferred embodiment, it is sometimes advantageous to add a buffer such as sodium bicarbonate to the reaction mixture prior to polymerization and to add catalyst during later stages of polymerization to force the polymerization to completion. In an especially preferred batchwise method, it is desirable to use the amide pigment prepared in the foregoing manner as a seed latex to prepare an amide pigment of a larger and more desirable particle size. In such instance, the seed latex is added to the polymerization zone or formed therein insitu before polymerization of remaining monomer. Polymerization of remaining monomer is effected as described hereinbefore, preferably in a batchwise manner.

Alternatively, the monomers may be added continuously or intermittently during polymerization provided that amide monomer is present in the aqueous phase during polymerization and the surfactant is always present in the aforementioned amounts less than the CMC for the surfactant. In the practice of these alternative embodiments, it is desirable to maintain the temperature of polymerization below 80°C. In this alternative method, it is understood that catalyst and surfactant may be added to the polymerization zone prior to polymerization and/or during polymerization in continuous or intermittent fashion. In the case of the surfactant, however, it should be present in the reaction mixture prior to as well as during polymerization.

It is further understood that other methods, some involving modifications and/or combinations of the aforementioned methods, are also suitable provided that the presence of the specified amount of the surfactant and the amide monomer in the aqueous phase during polymerization is insured by such other method.

As polymerization catalysts, there may be used one or more peroxygen compounds which are known to act as free-radical catalysts. Usually convenient are the persulfates (including ammonium, sodium, and potassium persulfates), hydrogen peroxide, or the perborates, persilicates or percarbonates. There may also be used organic peroxides, either alone or in addition to inorganic peroxide or sulfoxylate compounds. Typical organic peroxides include benzoyl peroxide, tert-butyl hydroperoxide, cumene peroxide, acetyl peroxide, caproyl peroxide, tert-butyl perbenzoate, tert-butyl diperphthalate, methyl ethyl ketone peroxide, and the like. The choice of catalyst depends on part upon the particular combination of monomers to be polymerized. As might be expected, some of the monomers respond better to one type of catalyst than the other. Generally, however, the persulfates are preferred. A catalytic amount of catalyst is preferably from about 0.01 percent to about 3.0 percent by weight based on the weight of the total monomer charge.

In some instances, in order to effect polymerization at a temperature below that at which coagulation or coalescence of the latex might occur, it may be desirable to activate the catalyst. The activation may be best accomplished by using a redox system in which a reducing agent within the limits of about 0.001 percent to about 6 percent as based on the weight of total monomers is present in addition to the peroxygen catalyst. Many examples of such redox systems are known. Agents, such as hydrazine or soluble oxidizable sulfoxy compound, including the alkali metal salts of hydrosulfites, sulfites, and bisulfites, and the like can be employed. Redox systems may be activated by the presence of a small amount (a few parts per million) of polyvalent metal ions. Ferrous ions are commonly and effectively used or a tertiary amine which is soluble in the reaction medium may also be used as an activator.

Surfactants suitable for the purposes of this invention are the water-soluble anionic surfactants and mixtures thereof with nonionic surfactants with the anionic surfactants being preferred. In instances wherein a mixture of anionic and nonionic surfactants is to be employed, it is desirable that the major amount be anionic. Anionic surfactants include water soluble soaps of soap-forming monocarboxylic acids, e.g., alkali metal salts of linoleic acid dimer; and sulfated and sulfonated compounds having the general formula R — $OSO_3M$ and R — $SO_3M$, wherein R represents an organic radical having from 9 to 23 carbon atoms and M represents an alkali metal, an ammonium or amine group. Examples of the sulfonate and sulfate emulsifiers include sodium dodecyl benzene sulfonate, sodium oleyl sulfate, ammonium dodecyl benzene sulfonate, potassium lauryl sulfate, sodium dodecyl diphenyl oxide disulfonate, dioctyl potassium sulfosuccinate, dihexyl sodium sulfosuccinate, the aryl sulfonate-formaldehyde condensation products and other anionic emulsifiers as set forth in *McCutcheon's Detergents and Emulsifiers Annual*, John W. McCutcheon, Inc., Morristown, N.J. (1970). Nonionic surfactants which are suitable include the polyoxyalkylene agents, e.g., polyethyleneoxyethanol derivatives of methylene linked alkyl phenols, the ethylene glycol polyethers, the alkyl phenoxy polyethyleneoxyethanols having alkyl groups of 7 to 12 carbon atoms such as nonylphenoxy-poly(ethyleneoxy)ethanols and condensation products of ethylene oxide with high alkyl mercaptans having alkyl groups of about 9 carbon atoms, and condensation products of ethylene oxide with alkyl thiophenols having alkyl groups of 6 to 15 carbon atoms; ethylene nonyl phenol polyethers; the fatty acid esters of polyhydric alcohols e.g., propylene glycol fatty acid ester; and others set forth in McCutcheon, supra. Of the foregoing emulsifiers, dihexyl sodium sulfosuccinate is preferred.

After permitting the aqueous dispersion to cool to ambient temperature, the aqueous dispersion of polymeric particles (amide pigment) can be separated from undesirable impurities, such as coagulum by-product, by filtering the aqueous dispersion of polymeric particles through a stainless steel filter having the filter surface perforated to correspond with the standard 16 mesh size of the U.S. Standard Sieve Series. Alternatively, the polymeric particles may be recovered by spray drying techniques and subsequently redispersed to form a latex of particles having their original particle size. In recovering the amide pigment, it is preferable to avoid removing the serum from the particles or to recombine the serum with the particles before employment in paper coating. Such practice insures the presence of the water-soluble copolymer of hard monomer and amide which enhances the binding characteristics of the amide pigment.

The filtered aqueous dispersion of polymeric particles prepared by the method described above and ordinarily containing from about 20 to about 60 weight percent, preferably from about 40 to about 50 weight percent, of non-film forming polymeric solids which form the amide pigment of this invention is ready to be combined with a suitable binder to provide a paper coating composition.

The paper coating so described may be combined by dispersing the polymeric particles (amide pigment) of the aqueous dispersion in an aqueous medium containing the binder or by blending the aqueous dispersion with the aqueous medium containing the binder, thus eliminating the step of separating the particles from the aqueous dispersion. Generally, suitable ratios of binder to pigment in the coating range from about 1.3 to about 11.5 volume parts of binder, dry basis, to 38.8 volume parts, calculated on a dry basis, of pigment. The preferred ratios range from about 6.7 to about 10 volume parts of binder to 38.8 volume parts of polymeric particles.

It is further understood that the amide pigment alone or a combination of inorganic pigment and/or conventional plastic pigment with amide pigment are contemplated in the practice of this invention. In such combination the amide pigment is used in an amount which is effective to enhance the coating properties of pick resistance and the resistance of the coating to stick to the calendering rolls, as compared to a coating containing only the inorganic pigment and/or conventional plastic pigment as pigment. Preferably, the amide pigment constitutes at least about 5 weight percent of the total pigment. Suitable inorganic pigments for this purpose include clays such as kaolinite, illite, montmorillonite and beidellite; and other materials such as titanium dioxide, kieselguhr, calcium carbonate, calcium sulfate, calcium sulfite, blanc fixe, satin white, and zinc pigments, e.g., zinc oxide, zinc sulfide and lithopane. Suitable conventional plastic pigments are described in U.S. Pat. No. 3,779,800 to E. Heiser which is incorporated by reference herein in its entirety.

Binders suitable for the purposes of this invention include coating compositions which are non-solvents for the polymeric pigment to be used and which are adaptable to a paper coating process to provide an adherent, smooth, glossy layer suitable for printing. Exemplary suitable binders include the natural binders such as starch, modified starch, soy bean, protein and casein and commonly known synthetic binders. Suitable modified starch binders include oxidized, enzyme converted, or hydroxy-ethylated starch. Suitable synthetic binders include the styrene/butadiene copolymer latexes; the latexes of polymers of alkyl esters of $\alpha,\beta$-ethylenically unsaturated carboxylic acids such as the alkyl acrylates and methacrylates, especially such aqueous dispersions of polymers which include a small amount of a copolymerized ethylenically unsaturated carboxylic acid; the latexes of copolymers of butadiene and acrylonitrile, latexes of copolymers of vinyl acetate and the alkyl acrylates, latexes of copolymers of butadiene and methyl methacrylate, latexes of copolymers of vinyl chloride and vinylidene chloride, latexes of vinyl chloride polymers, latexes of vinylidene chloride copolymers; aqueous dispersions of polybutadiene, polyvinyl acetate, polyvinyl alcohol and other synthetic polymers commonly used as pigment binders in paper coatings. As is typical of such binders, they are preferably film-forming at room temperature and must be film-forming at temperatures used in the paper coating operation.

The coating is applied to a paper substrate by a conventional technique such as air knife, trailing blade, inverted blade, roll coaters, sprayers and the like.

After the coating is applied, the surface of the substrate is dried and often is then finished by calendering or supercalendering. It is critical that the temperature of the coating does not exceed the softening point of the amide particles, otherwise the particles will lose their discrete character or proper size and shape. When this occurs, the opacity and brightness of the coated surface drops substantially.

The use of amide pigment as at least a portion of the pigment in a paper coating composition reduces the time required to dry coatings of such compositions and improves finish and visual gloss to papers coated with such compositions.

Where the solvent sensitivity of a specific amide pigment presents a problem, a coating containing the amide pigment may be applied to the paper substrate as a base coating and such base coating is subsequently coated with a coating containing an inorganic pigment which is not as sensitive to solvents. Since by that procedure much less coating containing the inorganic pigment will be required to yield a surface with the desired gloss and opacity, the total coating weight is usually reduced about 25 percent.

The following examples illustrate the invention, but are not to be construed as limiting its scope. All parts and percentages (except standard particle size deviation) are by weight. Weight parts are based on 100 weight parts of total monomers unless otherwise indicated.

EXAMPLE 1

Step 1

To 10 oz. citrate bottle are added the following ingredients:

| Ingredients | Dry Weight parts | Wet Weight parts |
| --- | --- | --- |
| Dihexyl sodium sulfosuccinate | 0.6 | 12 |

| Ingredients | Dry Weight parts | Wet Weight parts |
|---|---|---|
| Potassium persulfate | 0.3 | 6 |
| Sodium bicarbonate | 0.3 | 6 |
| Styrene | 57 | 57 |
| Acrylamide | 3 | 3 |
| Deionized Water | — | 117.2 |

The bottle is purged with nitrogen, sealed and rotated in a water bath at 65°C for 16 hours. The resulting aqueous dispersion of polymeric particles (latex) is cooled, filtered and determined to be a stable, highly monodisperse latex having an average particle diameter of 0.37 micrometer with less than 1 percent of the particles having diameters outside the range of 0.3 to 0.8 micrometer.

Step 2

Using the latex of Step 1 as a seed latex, the following ingredients:

| Ingredients | Dry Weight parts | Wet Weight parts |
|---|---|---|
| Dihexyl sodium sulfosuccinate | 0.5 | 20 |
| Potassium persulfate | 0.2 | 4 |
| Sodium bicarbonate | 0.2 | 4 |
| Styrene | 38 | 38 |
| Acrylamide | 2 | 2 |
| Seed Latex | | 70 |
| Deionized water | | 60 | are polymerized in a citrate bottle and recovered as in Step 1. The resulting product is a stable, monodisperse 30.8 percent polymer solids latex of amide pigment [water-insoluble styrene/acrylamide (95/5) copolymer] having an average particle size of 0.54 micrometer with less than 1 percent of the particles having diameters outside the range of 0.3 to 0.8 micrometer.

A coating composition is prepared by mixing 100 parts (dry basis) of the amide pigment with 26 parts (dry basis) of cooked ethylated starch. The solids of the composition are adjusted to 30 percent and pH to 7.9 by addition of aqueous ammonia. Enough of the composition is applied by a Meyer rod to a paper substrate to obtain 5 pounds of dried coating per book ream of paper. The coated paper is cut to a width of 7 inches and passed through the nip of a laboratory supercalender at 1200 pounds per linear inch and different temperatures beginning at 150°F. The degree of sticking to the steel roll of the supercalender is evaluated qualitatively by sound of paper sticking to roll, the degree of curl of the paper and the effect the supercalendering has on the resultant finished paper. It is observed that the coated paper containing the amide pigment can be supercalendered at temperatures from 20°–40°F higher before sticking and curling of the paper than can similar coated papers containing conventional styrene/acrylic acid (97/3) copolymer pigment.

Four sheets of paper coated with the composition containing the amide pigment and four sheets coated with another composition similar in all respects to said composition except containing conventional styrene/acrylic acid (97/3) copolymer pigment instead of the amide pigment are supercalendered 4 nips at 1200 pounds per linear inch and 150°F. After conditioning at standard TAPPI conditions, the finished papers are tested for gloss, brightness, opacity, ink receptivity and pick resistance. The results are recorded in Table I.

TABLE I

| Sample No. | 1 | C* |
|---|---|---|
| Pigment, dry parts | | |
| Styrene/Acrylamide, dry parts | 100 | |
| Styrene/Acrylic Acid, dry parts | | 100 |
| Starch Binder, dry parts | 26 | 26 |
| Sodium alginate, dry parts | 0.5 | None |
| Percent Solids | 30 | 30 |
| pH | 7.9 | 7.6 |
| Brookfield Viscosity [1], cps | | |
| 20 rpm | 330 | 370 |
| 100 rpm | 210 | 160 |
| 75° Gloss[2] | 66 | 74 |
| Percent Brightness[3] | 79.4 | 78.9 |
| TAPPI Opacity[4] | 87.8 | 87.2 |
| K&N Ink Receptivity[5], % Drop | 31.0 | 32.1 |
| IGT Pick Resistance[6], ft/min | **285[6] | 270[6] |

*Not an example of the invention.
**Fiber lifting or blistering occurs at this value before any evidence of coating pick.
[1] Viscosity in centipoise using a No. 4 spindle at 23°C.
[2] TAPPI Standard Method T 480 os-72.
[3] TAPPI Standard Method T 452 os-58.
[4] TAPPI Standard Method T 425 os-60.
[5] TAPPI Useful Method 553.
[6] TAPPI Suggested Method T 499 su-64 wherein "B" tension and 50 kilograms printing pressure is employed. Ink number is given in ( ).

EXAMPLE 2

Step 1.

Into a 2-liter, 3-necked flask equipped with a stirrer, $N_2$ inlet tube and condenser are added the following ingredients:

| Ingredients | Dry Weight parts | Wet Weight parts |
|---|---|---|
| Dihexyl sodium sulfosuccinate | 3.6 | 72 |
| Potassium persulfate | 2.4 | 48 |
| Sodium bicarbonate | 1.6 | 32 |
| Styrene | 465.6 | 465.6 |
| Acrylamide | 14.4 | 14.4 |
| Deionized Water | — | 571.6 |

The reaction mixture in the flask is stirred, and the flask is purged with $N_2$ for 10–20 minutes. The temperature of the reaction mixture is brought to 65°C and held while maintaining a positive pressure of $N_2$ for 6 hours. The resulting 40.4 percent solids latex is cooled and filtered for use in Step 2.

Step 2

Using the latex of Step 1 as a seed latex, the following ingredients:

| Ingredients | Dry Weight parts | Wet Weight parts |
|---|---|---|
| Dihexyl sodium sulfosuccinate | 1.0 | 20 |
| Potassium persulfate | 1.5 | 30 |
| Sodium bicarbonate | 1.0 | 20 |
| Acrylamide | 9 | 9 |
| Styrene | 291 | 291 |
| Step 1 latex | — | 160 |
| Deionized Water | — | 270.5 | are polymerized in the flask and recovered as in Step 1. The resulting product is a stable, monodisperse latex of amide pigment having an average particle size of 0.54 micrometer with less than 1 percent of the particles having diameters outside the range of 0.3 to 0.8 micrometers.

Using the paper coating procedure employed in Example 1, several coated papers are prepared and tested as in Example 1. The results are recorded in Table II.

TABLE II

| Sample No. | 1 | 2 | 3 | 4 | C* |
|---|---|---|---|---|---|
| Pigment, dry parts | | | | | |
|   Styrene/acrylamide | 100 | 100 | 100 | 100 | |
|   Styrene/acrylic acid | | | | | 100 |
| Starch Binder, dry parts | 26 | 13 | 5.2 | 2.6 | 26 |
| Sodium Alginate, dry parts | | | 0.5 | 1.0 | |
| Percent Solids | 40 | 40 | 40 | 40 | 40 |
| pH | 7.1 | 7.0 | 7.4 | 7.6 | 7.2 |
| Brookfield Viscosity[(1)], cps | | | | | |
|   20 rpm | 1230 | 640 | 120 | 30 | 3000 |
|   100 rpm | 745 | 360 | 90 | 40 | 1140 |
| 75° Gloss[(2)] | 56 | 59 | 73 | 72 | 57 |
| Percent Brightness[(3)] | 80.2 | 80.0 | 80.5 | 80.3 | 80.6 |
| TAPPI Opacity[(4)] | 88.2 | 88.5 | 88.7 | 88.4 | 88.5 |
| K&N Ink Receptivity[(5)] % Drop | 24.8 | 25.0 | 39.6 | 40.7 | 28.5 |
| IGT Pick Resistance[(6)] ft/min | NP** | NP** | 80[(6)] | 75[(4)] | 165[(7)] |

*Not an example of the invention.
**NP - No pick with a No. 8 ink.
[(1)–(6)]Same as in Table I.

EXAMPLE 3

Step 1

Into a 20 gallon reactor equipped with a stirrer, an $N_2$ inlet tube and a condenser are added the following ingredients at 30°C:

| Ingredients | Dry Weight parts | Wet Weight parts |
|---|---|---|
| Dihexyl sodium sulfosuccinate | 0.374 | 7.48 |
| Potassium persulfate | 0.3 | 6.0 |
| Sodium bicarbonate | 0.188 | 3.76 |
| Acrylamide | 2.4 | 2.4 |
| Condensate water | — | 73.7 |

The reactor is purged with $N_2$ for 20 minutes. A 57.6 part portion of styrene is then added. The reactor is heated to 65°C and maintained at such temperature for 7 hours under $N_2$ atmosphere. The resulting latex is cooled and filtered for use in Step 2.

Step 2

Using the latex of Step 1 as a seed latex, the following ingredients:

| Ingredients | Dry Weight parts | Wet Weight parts |
|---|---|---|
| Dihexyl sodium sulfosuccinate | 0.423 | 8.46 |
| Potassium persulfate | 0.3 | 6 |
| Sodium bicarbonate | 0.124 | 2.56 |
| Latex of Step 1 | — | 48 |
| Acrylamide | 2.4 | 2.4 |
| Styrene | 57.6 | 57.6 |
| Condensate water | | 50.1 | are charged into the 20 gallon reactor as in Step 1 and heated to 65°C for 5 hours. The resulting product is a stable, monodisperse latex of amide pigment having an average particle size of 0.52 micrometer with less than 1 percent of the particles having diameters outside the range of 0.3 to 0.8 micrometer. Based on total polymer it is found that 96.4 percent exists as water-insoluble copolymer particles of the latex and 3.6 percent exists as water-soluble styrene/acrylamide copolymer containing more than 50 percent polymerized acrylamide.

For purposes of comparison, a plastic pigment (Sample No. $A_1$) is prepared by the procedure of Example 1 of U.S. Pat. No. 3,595,823 to Huang. A second comparative pigment (Sample No. $A_2$) is similarly prepared except that the monomer composition of the pigment is varied. As a control (Sample No. C), a pigment is prepared of styrene/acrylic acid in the manner described in U.S. application Ser. No. 177,431 to Loeffler et al filed Sept. 2, 1971.

Using the paper coating procedure described hereinbefore in Example 1 except that calendering is carried out using 1000 pounds per linear inch and room temperature, several coated papers are prepared using the foregoing pigments and tested as in Example 1. The results are recorded in Table III.

TABLE III

| Sample No. | 1 | $A_1$* | $A_2$* | C* |
|---|---|---|---|---|
| Pigment[(a)], dry parts | | | | |
|   Sty/AAM (96/4) | 100 | | | |
|   Sty/VCN/AAM (81/18/1) | | 100 | | |
|   Sty/VCN/AAM (78/18/4) | | | 100 | |
|   Sty/AA (97/3) | | | | 100 |
| Starch Binder, dry parts | 15 | 15 | 15 | 15 |
| Percent Solids | 40 | 40 | 40 | 40 |
| pH | 7.3 | 7.4 | 7.6 | 7.4 |
| Brookfield Viscosity[(1)], cps | | | | |
|   20 rpm | 5080 | 4450 | 4070 | 1660 |
|   100 rpm | 1840 | 1470 | 1540 | 655 |
| Coat Weight, lbs/book ream | 5.4 | 5.5 | 5.2 | 6.1 |
| 75° Gloss[(2)] | 56.6 | 64.5 | 54.3 | 57.0 |
| Percent Brightness[(3)] | 84.8 | 81.2 | 79.4 | 84.4 |
| TAPPI Opacity[(4)] | 91.7 | 89.4 | 88.4 | 91.9 |
| K&N Ink Receptivity[(5)] % Drop | 48.9 | 36.7 | 35.0 | 50.4 |
| IGT Pick, Resistance[(6)] ft/min | 590[(6)] | 0[(2)] | 140[(2)] | 350[(3)] |

*Not an example of the invention.
[(a)]Sty-styrene, AAM-acrylamide, VCN-acrylonitrile and AA-acrylic acid.
[(1)–(6)]Same as in Table I.

As evidenced by the results recorded in Table III, the coatings containing the amide pigments of the present invention exhibit higher pick resistances than coatings containing conventional plastic pigments.

EXAMPLE 4

Using the amide pigments (Sample No. 1) of Example 3, several coating compositions are prepared by combining the pigment with coating compositions comprising varying amounts of kaolin clay and binder which is a mixture of styrene/butadiene copolymer latex and starch. Using the paper coating procedure of Example 1 except that supercalendering is carried out using 800 pounds per linear inch at 125°F, several coated papers are prepared and tested as in Example 1. The results are recorded in Table IV.

TABLE IV

| Sample No. | 1 | 2 | 3 | 4 | 5 | $A_1$* | $A_2$* | C* |
|---|---|---|---|---|---|---|---|---|
| Pigment, dry parts | | | | | | | | |
| Styrene/Acrylamide | 5 | 10 | 15 | 20 | 25 | | | |
| Clay, No. 1 | 95 | 90 | 85 | 80 | 75 | 95 | 75 | 100 |
| Styrene/Acrylic Acid | | | | | | 5 | 25 | |
| Binder, dry parts | | | | | | | | |
| S/B latex | 8 | 8 | 8 | 8 | 8 | 8 | 8 | 8 |
| Starch | 4 | 4 | 4 | 4 | 4 | 4 | 4 | 4 |
| Percent Solids | 51.5 | 51.5 | 51.4 | 51.3 | 51.5 | 51.5 | 51.5 | 51.4 |
| pH | 8.3 | 8.3 | 8.3 | 8.3 | 8.3 | 8.3 | 8.3 | 8.3 |
| Brookfield Viscosity[1], cps | | | | | | | | |
| 20 rpm | 3960 | 3530 | 3680 | 3580 | 3650 | 3400 | 3580 | 3420 |
| 100 rpm | 1200 | 1100 | 1110 | 1170 | 1400 | 980 | 1040 | 1020 |
| Coat Weight, lb/book ream | 9.0 | 9.9 | 9.5 | 8.6 | 9.7 | 10.2 | 9.4 | 8.8 |
| 75° Gloss[2] | 57 | 61 | 61 | 64 | 70 | 62 | 71 | 57 |
| Percent Brightness[3] | 78.0 | 79.2 | 78.7 | 79.7 | 80.0 | 77.3 | 79.4 | 77.1 |
| TAPPI Opacity[4] | 91.6 | 92.2 | 90.5 | 90.9 | 91.5 | 91.7 | 91.7 | 90.9 |
| K&N Ink Receptivity[5] % Drop | 31.6 | 35.5 | 35.6 | 36.0 | 39.7 | 31.6 | 35.2 | 25.7 |
| IGT Pick Resistance[6] ft/min | 400[5] | 410[5] | 410[5] | 440[5] | 460[5] | 320[5] | 230[5] | <50[5] |

*Not an example of the invention.
[1]–[6]Same as in Table I.

EXAMPLE 5

Into a 2-liter, 3-necked flask equipped with a stirrer, $N_2$ inlet tube and condenser are added the following ingredients:

| Ingredients | Dry Weight parts | Wet Weight parts |
|---|---|---|
| Dihexyl sodium sulfosuccinate | 1.6 | 32 |
| Potassium persulfate | 1.8 | 36 |
| Sodium bicarbonate | 1.1 | 22 |
| Acrylamide | 14.4 | 14.4 |
| Acrylonitrile | 64.8 | 64.8 |
| Styrene | 280.8 | 280.8 |
| Deionized water | — | 350 |

The contents of the flask are stirred at 200 rpm and the flask is purged with $N_2$ for 20 minutes. The temperature of the reaction mixture is brought to 70°C and held while maintaining a positive pressure of $N_2$ until an exotherm is observed after about 2.5 hours. Heating is continued for an additional hour until the exotherm subsides, and the resulting 44.5 percent solids latex is filtered and cooled. The resulting latex has an average particle size of 0.65 micrometer with a standard particle size deviation less than 1 percent. The pigmenting characteristics of the latex in coated paper are comparable to those of Example 3.

EXAMPLE 6

Following the procedure of Example 5 except that 246 parts of methyl methacrylate is added continuously over the first 2 hours of polymerization wherein the polymerization temperature is 60°C, a latex is prepared using the following ingredients:

| Ingredients | Dry Weight parts | Wet Weight parts |
|---|---|---|
| Dihexyl sodium sulfosuccinate | 0.8 | 16 |
| Potassium persulfate | 1.8 | 36 |
| Sodium bicarbonate | 0.9 | 18 |
| Acrylamide | 14.4 | 14.4 |
| Methyl methacrylate | 346.0 | 346.0 |
| Deionized water | — | 370 |

The pigmenting characteristics of the latex in coated paper are comparable to those of Example 3.

EXAMPLE 7

Step 1

Following the procedure of Example 2, an amide pigment is formed from the following ingredients:

| Ingredients | Dry Weight parts | Wet Weight parts |
|---|---|---|
| Dihexyl sodium sulfosuccinate | 4.5 | 90 |
| Potassium persulfate | 1.8 | 36 |
| Sodium bicarbonate | 1.2 | 24 |
| Acrylamide | 18 | 18 |
| Styrene | 342 | 342 |
| Deionized water | — | 694 |

The resulting 30.6 percent solids latex has an average particle diameter of 0.29 micrometer with a standard particle size deviation less than 1 percent.

Step 2

Using the latex of Step 1 as a seed latex, the following ingredients:

| Ingredients | Dry Weight parts | Wet Weight parts |
|---|---|---|
| Dihexyl sodium sulfosuccinate | 0.8 | 16 |
| Potassium persulfate | 1.5 | 30 |
| Sodium bicarbonate | 0.9 | 18 |
| Acrylamide | 15 | 15 |
| Styrene | 285 | 285 |
| Step 1 latex | — | 200 |
| Deionized water | — | 209.2 |

The resulting 45.4 percent solids latex has an average particle size diameter of 0.505 micrometer with a standard particle size deviation less than 1 percent.

The resulting latex is centrifuged at 19,500 rpm and the polymer solids are washed free of serum, dried and weighed. A water-soluble component is precipitated from the serum by addition of methanol and then washed and dried. Nitrogen analysis and infrared spectral analysis of the dried water-soluble component indicates a styrene/acrylamide copolymer containing 70 percent polymerized acrylamide and 30 percent polymerized styrene. Similar analysis of the insoluble copolymer indicates a styrene/acrylamide copolymer containing 97.5 percent polymerized styrene and 2.5 percent polymerized acrylamide. Total polymer consists of 95.1 percent of the water-insoluble copolymer and 4.9 percent of the water-soluble copolymer.

The pigmenting characteristics in coated paper of the water-insoluble copolymer before and after removal of the serum are similar except that the coating containing the copolymer after serum is removed exhibits a somewhat lower pick resistance. Both of the coatings exhibit higher pick resistances than a coating containing a conventional plastic pigment or an inorganic pigment.

What is claimed is:

1. A coated paper comprising a paper substrate having adhered thereto a coating composition comprising a binding amount of from about 1.3 to about 11.5 dry volume parts of a binder and an opacifying amount of 38.8 dry volume parts of a pigment, provided that at least a portion of said pigment is in the form of an amide pigment comprising a water-insoluble copolymer of an emulsion polymerizable, $\alpha,\beta$-ethylenically unsaturated hard monomer and at least about 1 weight percent of an emulsion polymerizable, $\alpha,\beta$-ethylenically unsaturated amide in the form of non-film forming discrete particles having an average particle diameter in the range from about 0.25 to about 1 micrometer with no more than 10 weight percent of said particles having diameters outside said range, said unsaturated amide being selected from the group consisting of acrylamide, methacrylamide, amides of fumaric acid, maleic acid, itaconic acid and citraconic acid, N-isopropylacrylamide, and N-(2-hydroxyethyl)acrylamide, said portion of amide pigment being sufficient to impart improved pick resistance as compared to a coating containing only inorganic pigment.

2. The coated paper of claim 1 comprising a paper substrate having adhered thereto a coating composition comprising (1) a binding amount of from about 1.3 to about 11.5 dry volume parts of binder, (2) an opacifying amount of 38.8 dry volume parts of pigment, provided that at least a portion of said pigment is in the form of a water-insoluble copolymer of from about 50 to about 99 weight percent of styrene and from about 1 to about 20 weight percent of acrylamide, said copolymer being in the form of non-film forming discrete particles having an average particle diameter in the range from about 0.25 to about 1 micrometer with no more than 10 weight percent of said particles having diameters outside said range, said copolymer constituting at least about 5 weight percent of the pigment and (3) from about 1 to about 30 weight percent based on the pigment of a water-soluble copolymer of styrene and at least 50 weight percent of acrylamide.

3. The coated paper of claim 1 wherein the pigment composition comprises the amide pigment and from about 1 to about 30 weight percent based on said pigment of a water-soluble copolymer of said emulsion polymerizable, ethylenically unsaturated hard monomer and at least about 50 weight percent of said amide.

4. The coated paper of claim 1 wherein the hard monomer is a monovinylidene aromatic monomer.

5. The coated paper of claim 4 wherein the aromatic monomer is styrene.

6. The coated paper of claim 1 wherein the hard monomer is a mixture of monovinylidene aromatic monomer and an $\alpha,\beta$-ethylenically unsaturated nitrile.

7. The coated paper of claim 1 wherein the hard monomer is methylmethacrylate.

8. The coated paper of claim 1 wherein the amide is acrylamide.

9. The coated paper of claim 1 wherein the water-insoluble copolymer is a copolymer from about 50 to about 99 weight percent of the hard monomer, from about 1 to about 20 weight percent of the amide, and up to about 40 weight percent of an emulsion polymerizable, $\alpha,\beta$-ethylenically unsaturated soft monomer.

10. The coated paper of claim 1 wherein the pigment composition comprises the amide pigment and an inorganic pigment.

11. The coated paper of claim 10 wherein the inorganic pigment is clay.

12. The coated paper of claim 1 wherein the ratio of binder to pigment is in the range from about 1.3 to about 11.5 volume parts of binder to 38.8 volume parts of pigment, both parts being calculated on a dry basis.

13. The coated paper of claim 12 wherein the ratio of binder to pigment is in the range from about 6.7 to about 10 volume parts binder to 38.8 volume parts of pigment.

* * * * *